May 14, 1968  R. R. NEIL  3,382,694

BRAKE SHOE STRAIGHTENING MACHINE

Filed Dec. 27, 1965  3 Sheets-Sheet 1

INVENTOR:
RICHARD R. NEIL
BY Harrington A. Lackey
ATTORNEY

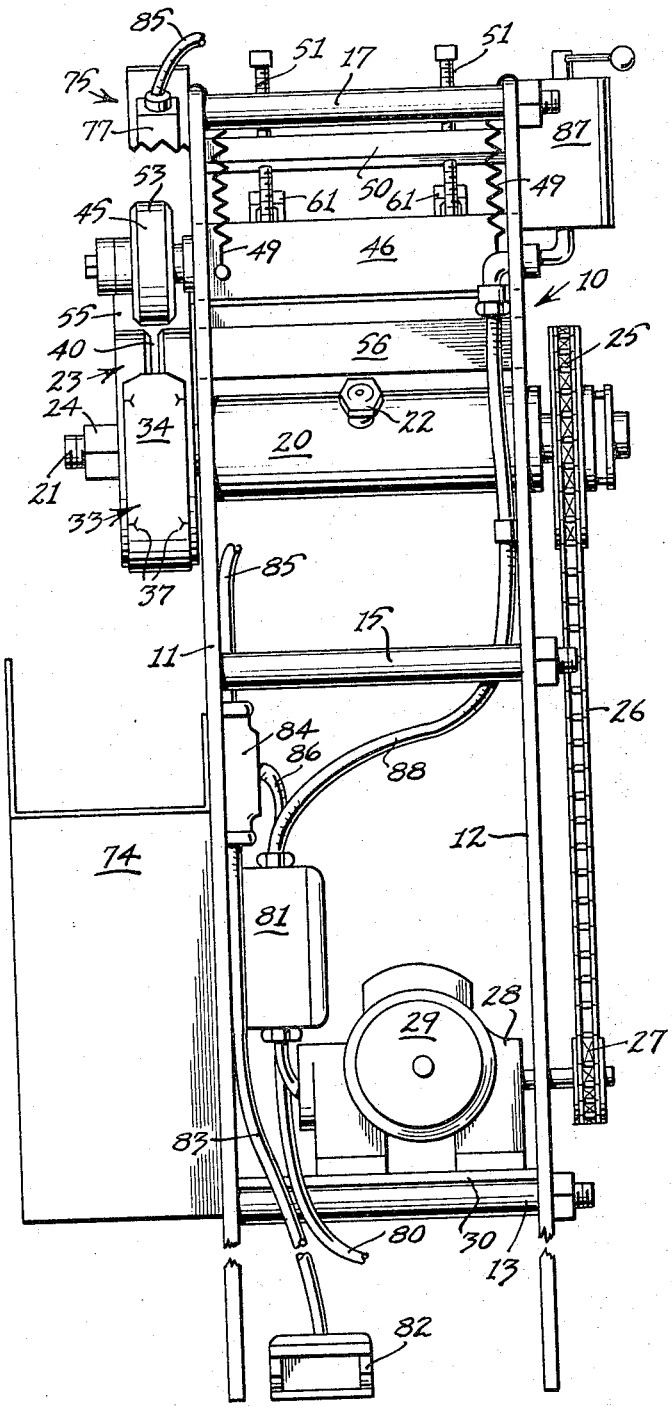

May 14, 1968

R. R. NEIL 3,382,694

BRAKE SHOE STRAIGHTENING MACHINE

Filed Dec. 27, 1965

INVENTOR:
RICHARD R. NEIL
BY Harrington A Lackey
ATTORNEY

United States Patent Office 3,382,694
Patented May 14, 1968

3,382,694
BRAKE SHOE STRAIGHTENING MACHINE
Richard Rice Neil, Donelson, Tenn. (% Neil Parts Rebuilders, Inc., 421 5th Ave. S., Nashville, Tenn. 37203)
Filed Dec. 27, 1965, Ser. No. 516,286
9 Claims. (Cl. 72—159)

This invention relates to a brake shoe straightening machine, and more particularly to a machine for straightening a brake shoe of the type having a flange extending in a circular arc with an inwardly extending and radially disposed web.

When the brake shoes for vehicles become bent, deformed and lose their true circular shape, they are usually re-conditioned and restored to their original shape for re-use, rather than being discarded. However, the customary method of reconditioning or straightening the brake shoes is by manually hammering the flange until it is restored as nearly as possible to a true circular shape.

It is an object of this invention to provide a machine which will automatically restore and re-form a deformed or bent brake shoe to its original shape in a matter of seconds.

Another object of this invention is to provide a machine for straightening brake shoes continuously and approximately as rapidly as the shoes can be fed to the machine.

Another object of this invention is to provide a machine for straightening brake shoes having a true circular mandrel of the same radius as the re-formed shoe.

Another object of this invention is to provide a machine for straightening brake shoes including a true circular mandrel for receiving a brake shoe and a pair of straightener rollers for applying graduated pressures to the shoe as it is progressively carried beneath the rollers.

Another object of this invention is to provide a brake shoe straightening machine having a positively driven mandrel especially constructed for receiving and carrying a brake shoe having a circular flange and a radially disposed web.

A further object of this invention is to provide a brake shoe straightening machine including a mandrel having a true circular circumference for receiving and carrying a brake shoe, a first straightener roller for applying pressure against the shoe to eliminate major deformations, and a second straightener roller for applying substantially more pressure against the brake shoe to eliminate all deformations in the shoe.

Further objects and advantages of the invention will be apparent from the following description taken in conjunction with the drawings, wherein:

FIG. 2 is a front elevation of the invention disclosed in FIG. 1, with portions of the safety switch broken away to show the mandrel and rollers;

FIG. 3 is a fragmentary front elevation of the safety switch, mandrel and rollers;

Figures 1, 6:
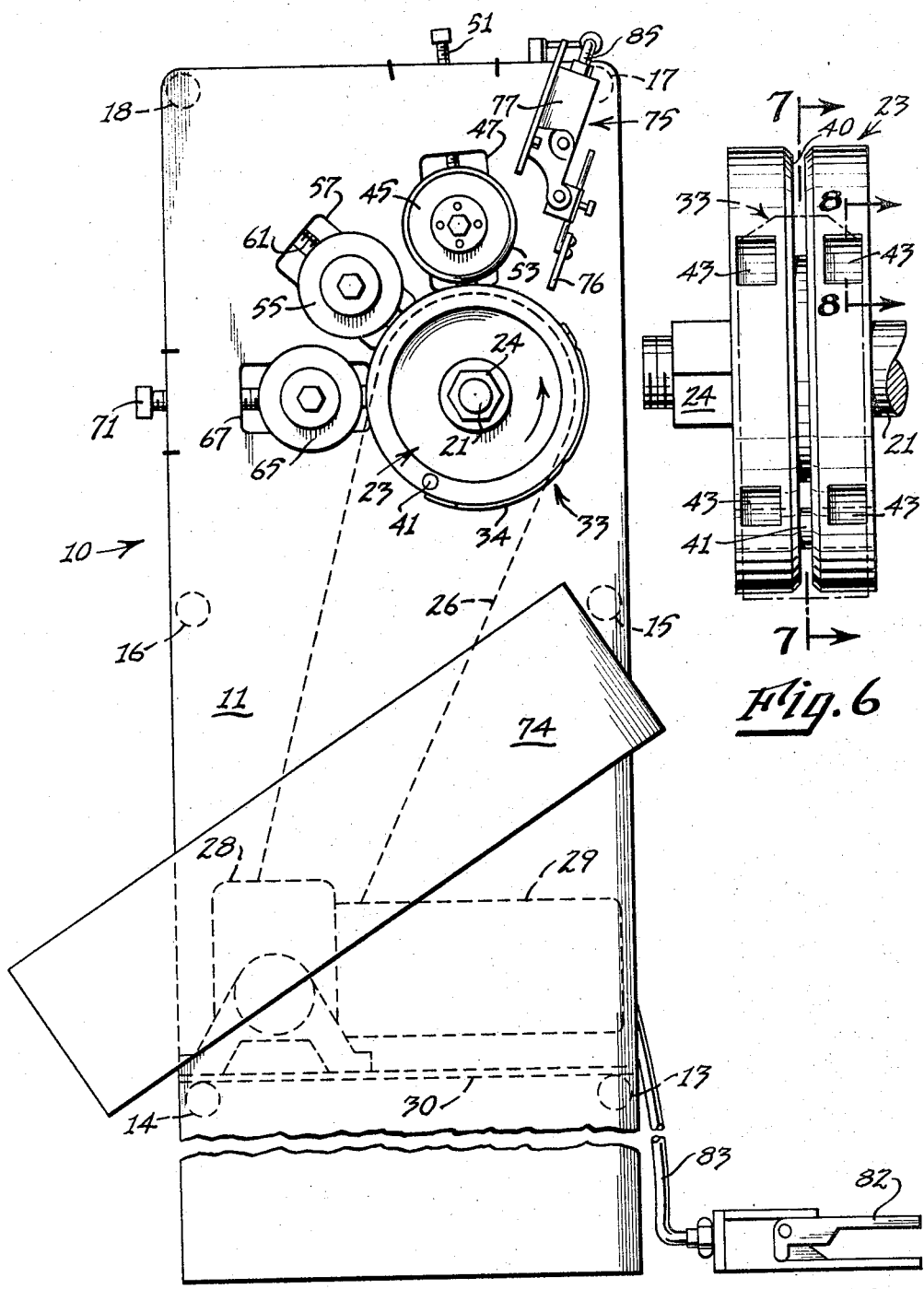
FIG. 1 is a side elevation of the invention, with a brake shoe mounted on the mandrel in its initial operative position.
FIG. 6 is an enlarged front elevational view of the mandrel supporting a brake shoe in phantom.

Referring now to the drawings in more detail, the brake shoe straightening machine made in accordance with this invention comprises a frame 10 having a left side wall 11 and a right side wall 12 supported in vertical parallel relation by means of spacer rods or bars 13, 14, 15, 16, 17 and 18.

Also extending transversely between the side walls 11 and 12 is a cylindrical bearing sleeve 20 for rotatably journalling the mandrel drive shaft 21 and which is lubricated through grease fitting 22. The cylindrical mandrel 23 is fixed to the left end of the drive shaft 21 extending beyond the left side wall 11, by any convenient means such as the threaded nut 24. The opposite end of the mandrel shaft 21 extends through the right side wall 12 and is fixed to a large driven sprocket 25. The driven sprocket 25 is connected by chain 26 to drive sprocket 27 driven by the transmission 28, which is coupled to the electrical motor 29. The motor 29 may be mounted upon a motor platform 30, which in turn is supported by the bottom spacer rods 13 and 14.

The mandrel 23 is particularly designed for receiving and shaping the conventional motor vehicle brake shoe 33 disclosed in FIGS. 1, 2, 3, and 7. This brake shoe 33 has a steel flange 34 extending in a circular arc with a steel web 35 projecting inwardly in substantially the central radial plane of the brake shoe 33. One end of the web 35, the lower end disclosed in FIG. 7, includes a substantially semi-circular notch 36. The flange 34 also includes a plurality of inwardly directed protuberances 37. The notch 36, the protuberances 37, the other holes and the inward configuration of web 35 are particularly designed for securing the brake shoe 33 in the brake mechanisms of a vehicle wheel.

The mandrel 23 is cylindrical, having a radius equal to the inner radius of the flange 34 and having a circumferential groove 40 extending in the central radial plane of the mandrel 23 and having a width approximately equal to, or even slightly greater than, the thickness of the web 35. When the brake shoe 33 is operatively mounted upon the mandrel 23, the web 35 will slidably or frictionally fit within the groove 40 so that the lateral stability of the brake shoe 33 will be maintained during the operation of the machine; and the web 35 may be lightly held within the groove 40, depending upon the degree of frictional engagement.

Extending transversely of and within the groove 40 is a transverse pin 41 spaced from the periphery of the mandrel 23 and having a radius equal to the radius of the semi-circular notch 36. Thus, the notch 36 will receive and be supported by the transverse pin 41 when the flange 34 is fitted flush against the periphery of the mandrel 23 in operative position.

Figure 8:
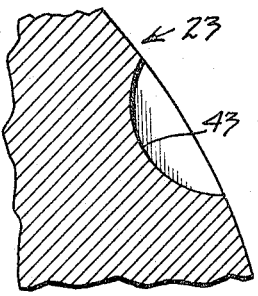
FIG. 8 is an enlarged fragmentary sectional elevation taken along the line 8—8 of FIG. 6.
Figure 4:
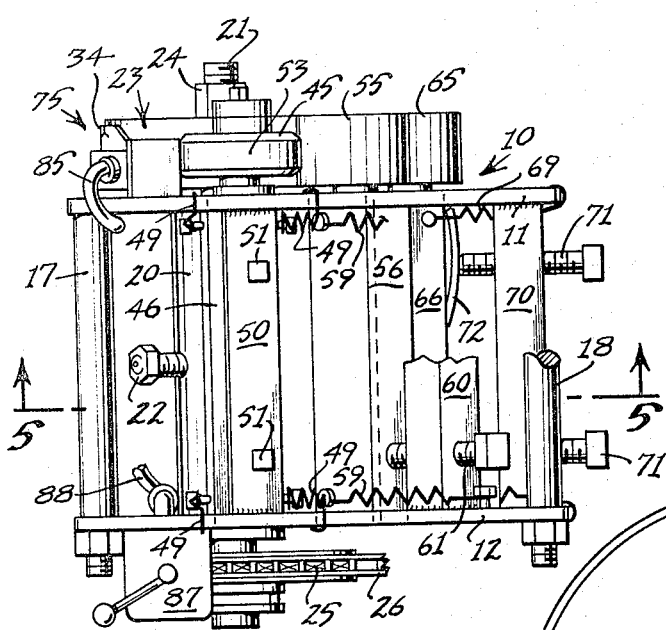
FIG. 4 is a top plan view of the invention with portions broken away to better show the straightener roller axle blocks.
Figure 7:
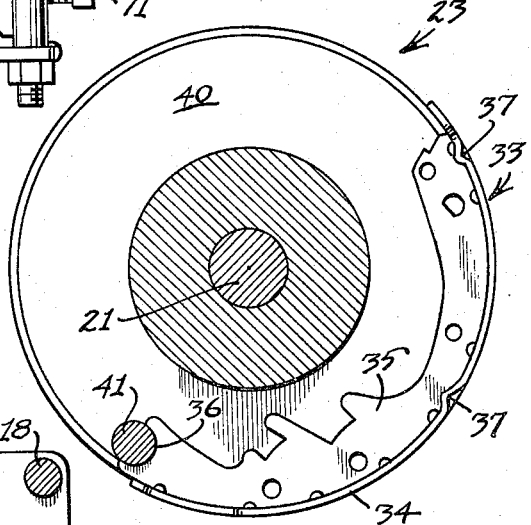
FIG. 7 is a section taken along the line 7—7 of FIG. 6, with the brake shoe shown in solid lines.
Figure 5:
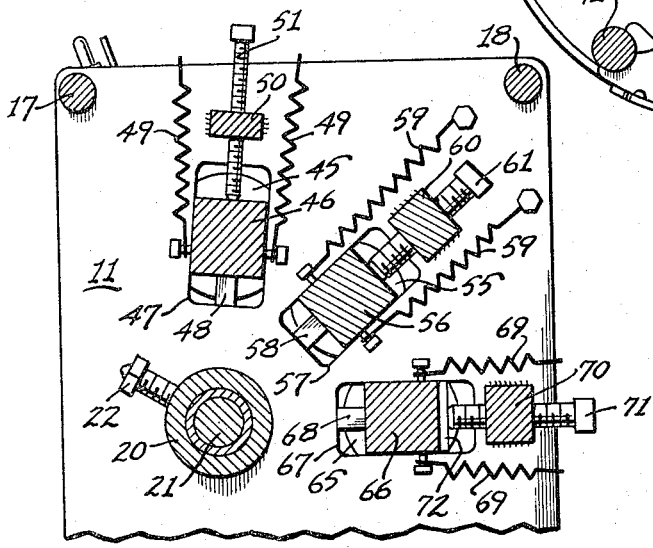
FIG. 5 is a section taken along the line 5—5 of FIG. 4.

As best disclosed in FIGS. 6 and 8, arcuate depressions 43 are formed in the periphery of the mandrel 23 and approximately spaced to register with the protuberances 37 when the brake shoe 33 is operatively fitted upon the mandrel 23 with the notch 36 engaging the pin 41.

As best disclosed in FIGS. 1 and 2, a guide or feed roller 45 preferably having a frictional and yieldable surface such as rubber 53, is mounted for rotatable movement on one end of an axle block 46. The axle block 46 extends transversely of the machine and through elongated rectangular slots in the side walls 11 and 12, such as the slot 47 in side wall 11. The slots 47 are disposed radially of the mandrel drive shaft 21, so that the axle block 46 is slidably within the slots 47 radially of the mandrel 23. A stop member, such as the fixed spacer block 48, is provided in the inner end of each slot 47 to limit the inward movement of the axle block 46. A pair of springs 49 are secured to the axle block 46 and to the side wall 11 to bias the axle block 46, and consequently the guide roller 45, away from the mandrel 23. A transverse adjustment bar 50 is fixed between the side walls 11 and 12 above the axle block 46 for threadedly receiving adjustment screws 51, the bottom ends of which abut against the top of the axle block 46.

By turning the adjustment screws 51, the axle block 46 and the guide roller 45 may be moved toward the mandrel 23 until the axle block 46 abuts the spacer blocks 48. The dimensions of the spacer blocks 48 are designed to afford the proper spacing between the peripheries of the guide roller 45 and the mandrel 23. By backing off or reversing the rotation of the adjustment screws 51, the guide roller 45 will be moved away from the mandrel 23 by the tension in the retractible springs 49.

Since the guide roller 45 merely functions to engage the flange 34 and yieldingly hold the brake shoe 33 in place on the mandrel 23 as it rotates, the spacing between the periphery of the mandrel 23 and the surface of the frictional material 53 just equals the thickness of the flange 34. A minimum of pressure is exerted against the brake shoe 33 by the guide roller 35 because of the yielding characteristics of the material 53.

As noted in FIG. 1, the mandrel 23 is driven to rotate in the direction of the arrow, that is, counter-clockwise, so that the guide roller 45 is the first roller encountered by the brake shoe 33 carried by the rotating mandrel 23.

After the brake shoe 33 is moved past the guide roller 45, the shoe 33 is engaged by the first straightener roller 55 which is mounted for free rotatable movement upon the end of the axle block 56 extending through elongated slots 57 in the side walls 11 and 12. The slots 57 are also disposed radially to the drive shaft 21 so that the axle block 56 and the first straightener roller 55 are slidable within the slots 57 radially of the mandrel 23. A stop member or spacer block 58, similar to the stop member 48 is provided in the inner end of the slot 57 to limit the inward movement of the axle block 56. Springs 59 similar to springs 49 are mounted on the side walls 11 and 12 to bias the axle block 56 outwardly. The transverse adjustment bar 60, similar to but of greater cross-section than the transverse bar 50, is fixed between the walls 11 and 12 to threadedly support adjustment screws 61 which abut the upper or outer surface of the axle block 56. Thus, the axle block 56 as well as the first straightener roller 55 may be adjusted radially of the mandrel 23 by means of the threaded screws 61 and the springs 59. The transverse adjustment bar 60 is thicker than the transverse adjustment bar 50 because the first straightener roller 55 must apply a moderate amount of pressure upon the flange 34 of the brake shoe 33 as it moves beneath the roller 55 in order to eliminate the larger deformations, such as bends in the flange 34. Consequently, the roller 55 which has a hard peripheral surface is spaced, within close tolerances, a distance equal to the thickness of the flange 34. It is the function of the first straightener roller 55 to restore the flange 34 to its original, true, round or circular shape.

After the brake shoe 33 passes beneath the first straightener roller 55, it then passes beneath the second straightener roller 65. The second straightener roller 65 is mounted in a similar manner to guide roller 45 and the first straightener roller 55. The second straightener roller 65 is mounted for free rotatable movement upon one end of the axle block 66, which in turn is mounted for reciprocable slidable movement radially of the drive shaft 21 within the elongated radial slots 67. The inner end of each slot 67 is provided with a stop member 68 similar to stop members 48 and 58. Springs 69 are mounted on the axle block 66 and the side wall 11 to bias the axle block 66 and the second guide roller 65 radially away from the mandrel 23. An adjustment bar 70 is fixed transversely between the walls 11 and 12 for threadedly receiving and supporting adjustment screws 71.

However, since the second straightener roller 65 is designed to eliminate the remaining minor deformations in the flange 34 which the first straightener roller 55 is unable to remove, the pressure upon the flange 34 by the second straightener roller 65 must be substantially greater than the force exerted by the first straightener roller 55. Consequently, the periphery of the second straightener roller 65 is normally spaced from the periphery of the mandrel 23 a distance slightly less than the thickness of the flange 34 of the brake shoe 33.

Moreover, a very strong spring, such as leaf-spring 72, is located between the end of an adjustment screw 71 and the outer surface of the axle block 66. Thus, as the mandrel 23 carries the brake shoe 33 beneath the second straightener roller 65, the flange 34 will thrust the roller 65 radially outwardly against the force of leaf-spring 73, sufficient for the flange 34 to pass beneath the roller 65. Consequently, the tremendous force exerted by the spring 72 through the axle block 66 and straightener roller 65 upon the flange 34 will eliminate the remaining minor deformations and restore the flange 34 to its original smooth arcuate shape.

Spaced below the mandrel 23 is a chute 74 for receiving the straightened brake shoe 33 and discharging the brake shoe to a deposit station, not shown, such as a box or conveyor belt.

Since the mandrel 23 is manually loaded with each brake shoe 33, a safety device 75 is mounted on the side wall 11 in front of the guide roller 45, and includes a switch arm 76 located to intercept the operator's hand or fingers before they enter the dangerous area between the guide roller 45 and the rotating mandrel 23. The switch arm 76 is pivotally connected to an electrical switch 77, so that as the arm 76 is forced rearwardly by the operator's hand, the switch 77 is energized to immediately stop the mechanism rotating the mandrel 23.

The controls for the electrical motor 29 disclosed in the drawings include an input power cable 80, a switch box 81, a foot pedal 82 and foot pedal cable 83 connected to a T-connector 84, which in turn is also connected through cable 85 to the safety switch 77. The T-connector 84 is connected to the switch box 81 by the cable 86. The motor-driven transmission 28 may be rotated forward, or in reverse, or stopped by the manual switch 87 through cable 88. The foot pedal 82 and the safety switch 77 merely start and stop the motor. It will of course be understood that other types of drives and control may be employed if desired.

From the above description, the operation of the machine is readily apparent. With the mandrel 23 immobile in its initial operative position disclosed in FIG. 1, a shoe 33 is fitted upon the mandrel 23 by inserting the web 35 into the groove 40, fitting the notch 36 upon the transverse pin 41 and seating the protuberances 37 within the arcuate recesses 43. When the brake shoe 33 is fitted in this manner, as disclosed in FIGS. 1 and 7, it will remain seated without manual support if there is sufficient frictional engagement between the web 35 and the groove 40. Nevertheless, the brake shoe 33 may be held in this position if necessary, until the machine is started. With the brake shoe 33 fitted on the mandrel 23, the foot pedal 82 is depressed to drive the mandrel 23 in the direction of the arrow disclosed in FIG. 1. The brake shoe 33 is carried first beneath the guide roller 45 to further support the brake shoe 33 in position upon the mandrel 23, as well as to assist in guiding and feeding the shoe to the first straightener roller 55. When the guide roller 45 engages the flange 34, there is no subsequent need for manually supporting the brake shoe 33. As previously described, if the brake shoe 33 must be manually held, the safety device 75 will automatically stop the rotation of the mandrel 23 to prevent accidental movement of the operator's hand between the roller 45 and the mandrel 23.

The guide roller 45 then feeds the brake shoe 33 beneath the first straightener roller 55, which is adjusted to eliminate the major deformations in the shoe 33, and particularly to restore the true circular shape of the flange 34, if the radius of the flange 34 is less than the radius of the mandrel 23. However, if the radius of the flange 34 is greater than the radius of the mandrel 23, a single hammer blow by the operator upon the flange 34 can reduce the radius to less than the mandrel radius so that the machine can straighten the shoe and restore the flange 34 to its true circular shape. Where such hammering is required, the spacer bar 15 may be employed as an anvil.

The brake shoe 33 is then fed beneath the second straightener roller 65 where the greatest force is applied to eliminate the minor deformations, such as dents and depressions in the flange 34. The straightened brake shoe 33, after it is completely past the second straightener roller 65 will either drop by gravity, or may be separated manually, if necessary, from the mandrel 23 to drop into the chute 74, where the straightened brake shoe 33 will be deposited in any convenient station, not shown.

The operation is then repeated for each brake shoe 33 desired to be straightened.

It will be readily observed that the operation is comparatively simple and rapid. Moreover, the straighteneing is efficient because the periphery of the mandrel is identical to the desired shape of the inner surface of the brake shoe 33. The function of the machine is also more efficient because it employs two straightener rollers 55 and 65 which gradually straighten the shoe 33 in successive stages of increasing forces. Furthermore, neither roller is subjected to all of the stress and wear, and less strain and fatigue is imposed upon the brake shoe 33, and particularly the flange 34.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A machine for straightening a brake shoe having a flange extending in a circular arc and a radially disposed web, comprising:
   (a) a frame,
   (b) a cylindrical mandrel having a radius equal to the inner radius of said flange,
   (c) said mandrel having a circumferential groove formed in a radial plane for receiving said web when said flange is fitted circumferentially on said mandrel in operative position,
   (d) means mounting said mandrel on said frame for rotation about its cylindrical axis,
   (e) means on said frame for rotatably driving said mandrel in one direction,
   (f) a first straightener roller,
   (g) means mounting said first roller on said frame for rotation about its axis parallel to said mandrel axis, and spaced from said mandrel to apply moderate pressure to a brake shoe flange in operative position, sufficient to eliminate major deformations in said flange,
   (h) a second straightener roller,
   (i) means mounting said second roller on said frame for rotation about its axis parallel to said mandrel axis and spaced from said mandrel to apply substantially more pressure to said brake shoe flange in operative position than said first roller, and sufficient to eliminate minor deformations in said flange,
   (j) said second straightener roller being spaced from said first straightener roller in the direction of rotation of said mandrel.

2. The invention according to claim 1 in which the spacing between the periphery of said first roller and the periphery of said mandrel equals, within close tolerances, the thickness of said flange.

3. The invention according to claim 1 in which the periphery of said second roller is spaced from the periphery of said mandrel slightly less than the thickness of said flange, said means for mounting said second roller including a spring biasing said second roller radially toward said mandrel.

4. The invention according to claim 1 further comprising a guide roller, and means mounting said guide roller to rotate about an axis parallel to said mandrel axis, spaced from said mandrel approximately the thickness of said flange, and spaced on the opposite side of said first roller from said second roller to engage and guide said flange toward said first roller.

5. The invention according to claim 4 in which the periphery of said guide roller comprises a yieldable, frictional material.

6. The invention according to claim 1 further comprising means in the circumferential groove of said mandrel for retaining said web in said groove when said brake shoe is fitted on said mandrel.

7. The invention according to claim 6 in which said brake shoe web has a circular notch formed in one end thereof, and a circular pin extends transversely within said groove for receiving said notch.

8. The invention according to claim 6 in which said brake shoe flange has inwardly extending protuberances, and the periphery of said mandrel is provided with recesses registering with and receiving said protuberances when said brake shoe is in operative position.

9. The invention according to claim 1 in which the mounting means for said first and second rollers includes axle blocks upon which said wheels are rotatably mounted, elongated slots in said frame for slidably receiving said axle blocks radially of said mandrel, and means adjustably mounting said axle blocks in said radial slots.

References Cited
UNITED STATES PATENTS

| | | | |
|---|---|---|---|
| 751,860 | 2/1904 | La Voo | 72—224 |
| 808,657 | 1/1906 | Heggie | 72—224 |
| 2,041,461 | 5/1936 | Floyd et al. | 29—481 X |
| 2,855,018 | 10/1958 | Strikeleather | 72—159 |
| 3,100,340 | 8/1963 | Goepfrich | 113—116 |
| 2,090,838 | 11/1937 | Gustafson | 72—293 |
| 2,144,321 | 1/1939 | Bauberger | 72—389 |

CHARLES W. LANHAM, *Primary Examiner.*

K. C. DECKER, *Assistant Examiner.*